US011693897B2

(12) United States Patent
Mehrotra

(10) Patent No.: US 11,693,897 B2
(45) Date of Patent: Jul. 4, 2023

(54) USING A HIERARCHICAL MACHINE LEARNING ALGORITHM FOR PROVIDING PERSONALIZED MEDIA CONTENT

(71) Applicant: Spotify AB, Stockholm (SE)

(72) Inventor: Rishabh Mehrotra, London (GB)

(73) Assignee: Spotify AB, Stockholm (SE)

( * ) Notice: Subject to any disclaimer, the term of this patent is extended or adjusted under 35 U.S.C. 154(b) by 289 days.

(21) Appl. No.: 17/075,302

(22) Filed: Oct. 20, 2020

(65) Prior Publication Data
US 2022/0121696 A1    Apr. 21, 2022

(51) Int. Cl.
*G06F 16/435*    (2019.01)
*G06N 20/00*    (2019.01)
*G06N 3/084*    (2023.01)
*G06N 3/045*    (2023.01)

(52) U.S. Cl.
CPC ........... *G06F 16/435* (2019.01); *G06N 3/045* (2023.01); *G06N 3/084* (2013.01); *G06N 20/00* (2019.01)

(58) Field of Classification Search
CPC .... G06F 16/435; G06N 20/00; G06N 3/0454; G06N 3/084
See application file for complete search history.

(56) References Cited

U.S. PATENT DOCUMENTS

2003/0229896 A1    12/2003  Buczak
2015/0058993 A1     2/2015  Choi et al.
2016/0147752 A1     5/2016  Manning et al.
2017/0230417 A1     8/2017  Amar et al.
2019/0102397 A1*    4/2019  Hornkvist ........... G06F 16/2471
(Continued)

FOREIGN PATENT DOCUMENTS

CN    108959603 A  * 12/2018    .............. G06N 3/02
CN    110990621 A     4/2020
(Continued)

OTHER PUBLICATIONS

Quadrana et al., "Personalizing Session-based Recommendations with Hierarchical Recurrent Neural Networks", Jun. 2017, Proceedings of the Eleventh ACM Conference on Recommender Systems (Year: 2017).*

(Continued)

*Primary Examiner* — Hosain T Alam
*Assistant Examiner* — Robert F May
(74) *Attorney, Agent, or Firm* — Morgan, Lewis & Bockius LLP

(57) ABSTRACT

An electronic device generates a score for each objective in a hierarchy of objectives. Generating the score comprises using a representation of the media content item and a user as inputs to a first machine learning algorithm, to generate a score for a first objective corresponding to a first level in the hierarchy of the objectives and using an output of the first machine learning algorithm, distinct from the score for the first objective, as an input to a second machine learning algorithm to generate a score for a second objective corresponding to a second level in the hierarchy of objectives. The electronic device generates a respective score between the user and the media content item using the score for the first objective and the score for the second objective and provides media content to the user based on the respective scores.

20 Claims, 10 Drawing Sheets

(56) References Cited

U.S. PATENT DOCUMENTS

| | | | |
|---|---|---|---|
| 2019/0205402 A1 | 7/2019 | Sernau et al. | |
| 2019/0228259 A1* | 7/2019 | Pinheiro | G06N 3/04 |
| 2019/0236480 A1* | 8/2019 | McKenna | G06N 20/20 |
| 2019/0303768 A1* | 10/2019 | Zhang | G06N 3/045 |
| 2021/0004402 A1 | 1/2021 | Li et al. | |
| 2021/0011958 A1* | 1/2021 | Cox | A63F 13/79 |
| 2021/0089963 A1* | 3/2021 | Baek | H04L 67/535 |
| 2021/0200824 A1* | 7/2021 | Kim | G06F 18/24323 |
| 2021/0295415 A1 | 9/2021 | Xu et al. | |

FOREIGN PATENT DOCUMENTS

| | | | | |
|---|---|---|---|---|
| CN | 111259192 A | * | 6/2020 | G06F 16/686 |
| CN | 111259192 A | | 6/2020 | |
| JP | 2005301704 A | * | 10/2005 | |

OTHER PUBLICATIONS

Covington et al., "Deep Neural Networks for YouTube Recommendations", Sep. 2016, ReeSys '16: Proceedings of the 10th ACM Conference on Recommender Systems p. 191-198https://doi.org/10.1145/2959100.2959190 (Year: 2016).*

Lin et al., "Heterogeneous Knowledge-Based Attentive Neural Networks for Short-Term Music Recommendations", Oct. 2018, Digital Object Identifier 10.1109/ACCESS.2018.2874959 (Year: 2018).*

Song, K., Ji, M., Park, S., & Moon, I.-C. (2019). Hierarchical Context Enabled Recurrent Neural Network for Recommendation. Proceedings of the AAAI Conference on Artificial Intelligence, 33(01), 4983-4991. https://doi.org/10.1609/aaai.v33i01.33014983 (Year: 2019).*

Y. Liu, C. Lyu, Z. Liu and D. Tao, "Building Effective Short Video Recommendation," 2019 IEEE International Conference on Multimedia & Expo Workshops (ICMEW), 2019, pp. 651-656, doi: 10.1109/ICMEW.2019.00126. (Year: 2019).*

Machine English translation of CN110990621A, dated Aug. 21, 2020, 51 pgs.

Machine English translation of CN111259192A, dated Aug. 21, 2020, 38 pgs.

Mehrotra, Office Action, U.S. Appl. No. 17/075,305, dated May 11, 2022, 12 pgs.

Mehrotra, Notice of Allowance, U.S. Appl. No. 17/075,305, dated Sep. 8, 2022, 9 pgs.

\* cited by examiner

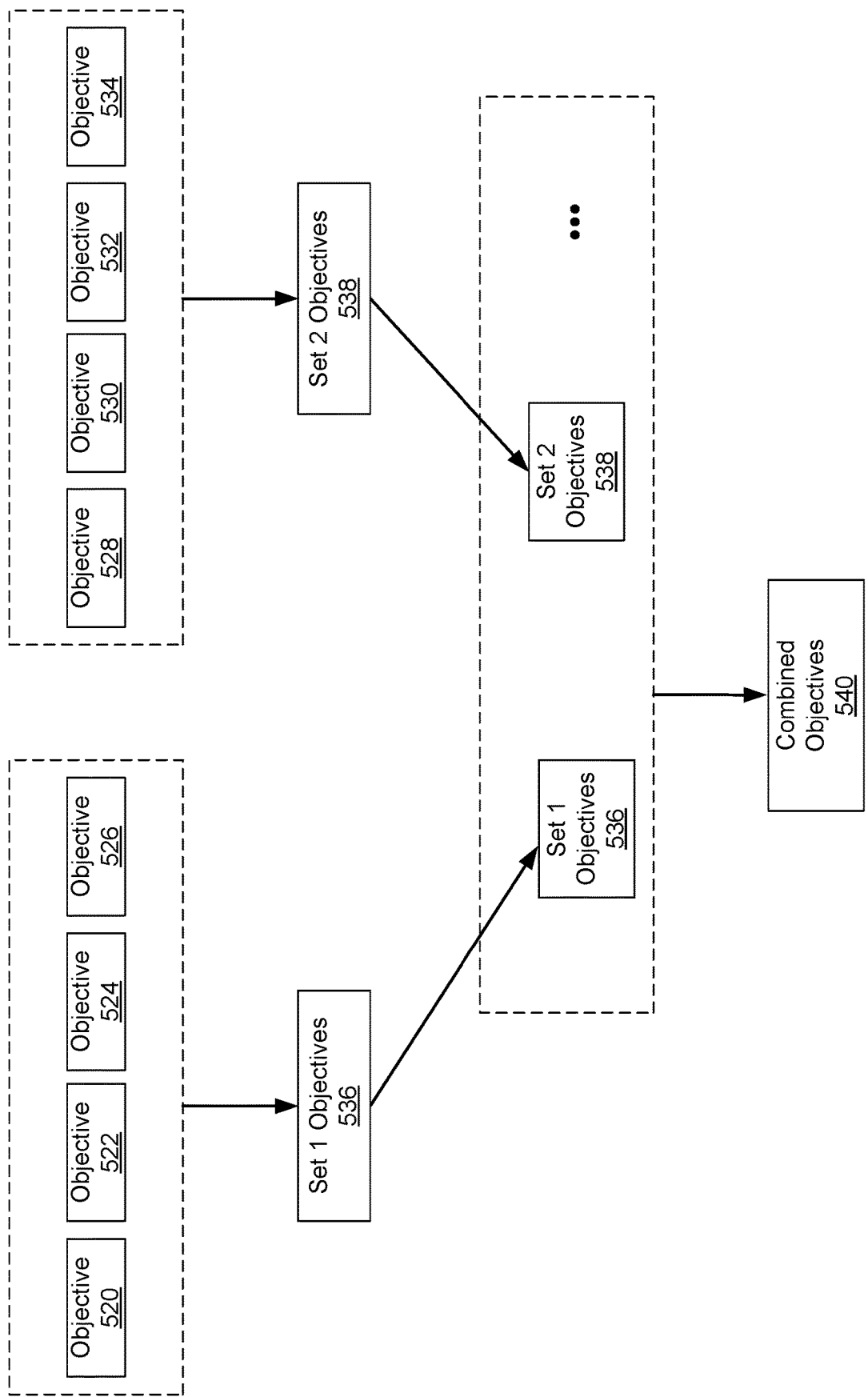

USING A HIERARCHICAL MACHINE LEARNING ALGORITHM FOR PROVIDING PERSONALIZED MEDIA CONTENT

RELATED APPLICATIONS

This application is related to U.S. application Ser. No. 17/075,305, filed Oct. 20, 2020, entitled "Systems and Methods for Using Hierarchical Ordered Weighted Averaging for Providing Personalized Media Content," which is hereby incorporated in its entirety.

TECHNICAL FIELD

The disclosed embodiments relate generally to media playback, and, in particular, to selecting media content for a user based in part on objectives determined using a hierarchical machine learning algorithm.

BACKGROUND

Access to electronic media, such as music and video content, has expanded dramatically over time. As a departure from physical media, media content providers stream media to electronic devices across wireless networks, improving the convenience with which users can digest and experience such content.

Media content providers provide recommendations of content to users. Media content providers collect data related to their users in order to provide better and more personalized recommendations.

SUMMARY

There is a need for systems and methods of choosing media content items to present to a user, such as an order of media content items in a playlist. The chosen media content items may be recommended to the user, such that the user is enabled to select the media content for playback, or may be automatically presented to the user without user input.

To that end, the present disclosure is directed to generating scores between a user and a plurality of media items in order to determine which media items to present to the user. For example, in some embodiments, the user is provided the media item with the highest score.

One object of the present disclosure is to predict scores for a plurality of different objectives, which can then be combined to determine an overall score between the user and the media item. For example, the system aims to recommend media content to a user that the user is likely to complete, rather than skip halfway through playback. The systems also recognizes that it is desirable if the user marks the recommended media content item as a favorite (e.g., "hearts" the recommended media content item). An insight of the present disclosure is that these objectives, though distinct, are not necessarily decoupled: whether a user completes the media has bearing on whether the user is likely to mark the media content item as a favorite. In fact, these objectives are hierarchical in nature, where user engagement objectives (e.g., whether the user is likely to skip the media or complete the media) being foundational (e.g., lower in the hierarchy) to overall user satisfaction objectives.

With that insight in mind, in some embodiments, for each of a plurality of media items, a representation of the user and the media item is received by a computer system. The representation may include information corresponding to the user's context (e.g., time of day), the user's listening history, the media item's popularity over the previous two weeks, and so on. The representation is passed to a machine learning structure with multiple machine learning algorithms that are arranged hierarchically, meaning that machine learning algorithms used to predict lower-level objectives are connected to machine learning algorithms used to predict higher-level objectives. This way, the entire machine learning structure can be trained using historical data from the media-providing service (e.g., via back-propagation through the entire machine learning structure). Because of the connections between the algorithms for predicting the different levels of objectives, adjustments to the machine learning algorithms for predicting the higher-level objectives result (through back-propagation) in adjustments to the machine learning algorithms for lower-level objectives.

To that end, in accordance with some embodiments, a method is performed at an electronic device. The electronic device has one or more processors and memory storing instructions for execution by the one or more processors. The method includes, for each respective media content item of a plurality of media content items, receiving a representation of the media content item and a user and generating a score for each objective in a hierarchy of objectives. Generating the score comprises using the representation of the media content item and the user as inputs to a first machine learning algorithm, to generate a score for a first objective corresponding to a first level in the hierarchy of the objectives and using an output of the first machine learning algorithm, distinct from the score for the first objective, as an input to a second machine learning algorithm to generate a score for a second objective corresponding to a second level in the hierarchy of objectives. The first machine learning algorithm and the second machine learning algorithm are trained using back-propagation from the second machine learning algorithm to the first machine learning algorithm. The method further includes generating a respective score between the user and the media content item using the score for the first objective and the score for the second objective and providing media content to the user based on the respective scores between the user and the media content items in the plurality of media content items.

In accordance with some embodiments, an electronic device (e.g., a server system, a client device, etc.) includes one or more processors and memory storing one or more programs configured to be executed by the one or more processors. The one or more programs include instructions for, for each respective media content item of a plurality of media content items, receiving a representation of the media content item and a user and generating a score for each objective in a hierarchy of objectives. Generating the score comprises using the representation of the media content item and the user as inputs to a first machine learning algorithm, to generate a score for a first objective corresponding to a first level in the hierarchy of the objectives and using an output of the first machine learning algorithm, distinct from the score for the first objective, as an input to a second machine learning algorithm to generate a score for a second objective corresponding to a second level in the hierarchy of objectives. The first machine learning algorithm and the second machine learning algorithm are trained using back-propagation from the second machine learning algorithm to the first machine learning algorithm. The one or more programs include instructions for generating a respective score between the user and the media content item using the score for the first objective and the score for the second objective and providing media content to the user based on the respective scores between the user and the media content items in the plurality of media content items.

In accordance with some embodiments, a computer-readable storage medium has stored therein instructions that, when executed by an electronic device, cause the electronic device to, for each respective media content item of a plurality of media content items, receive a representation of the media content item and a user and generate a score for each objective in a hierarchy of objectives. Generating the score comprises using the representation of the media content item and the user as inputs to a first machine learning algorithm, to generate a score for a first objective corresponding to a first level in the hierarchy of the objectives and using an output of the first machine learning algorithm, distinct from the score for the first objective, as an input to a second machine learning algorithm to generate a score for a second objective corresponding to a second level in the hierarchy of objectives. The first machine learning algorithm and the second machine learning algorithm are trained using back-propagation from the second machine learning algorithm to the first machine learning algorithm. The instructions further cause the electronic device to generate a respective score between the user and the media content item using the score for the first objective and the score for the second objective and provide media content to the user based on the respective scores between the user and the media content items in the plurality of media content items.

Thus, systems are provided with improved methods for identifying and providing a user with a recommended list of media content items.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 5A-5B is a block diagram illustrating combining multiple objectives using ordered weighted averaging, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
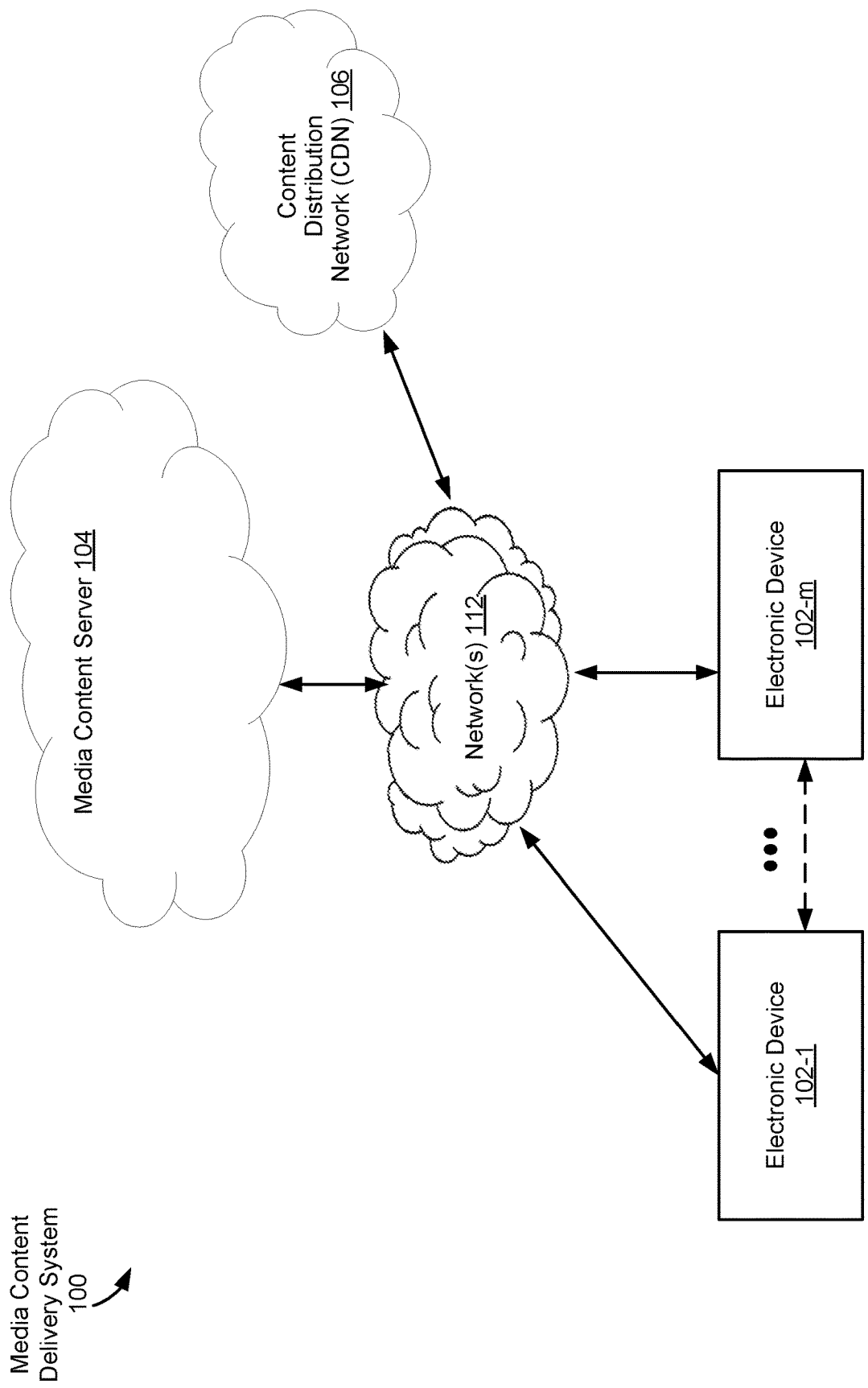
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-*m*, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service (e.g., key database 336, FIG. 3). In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
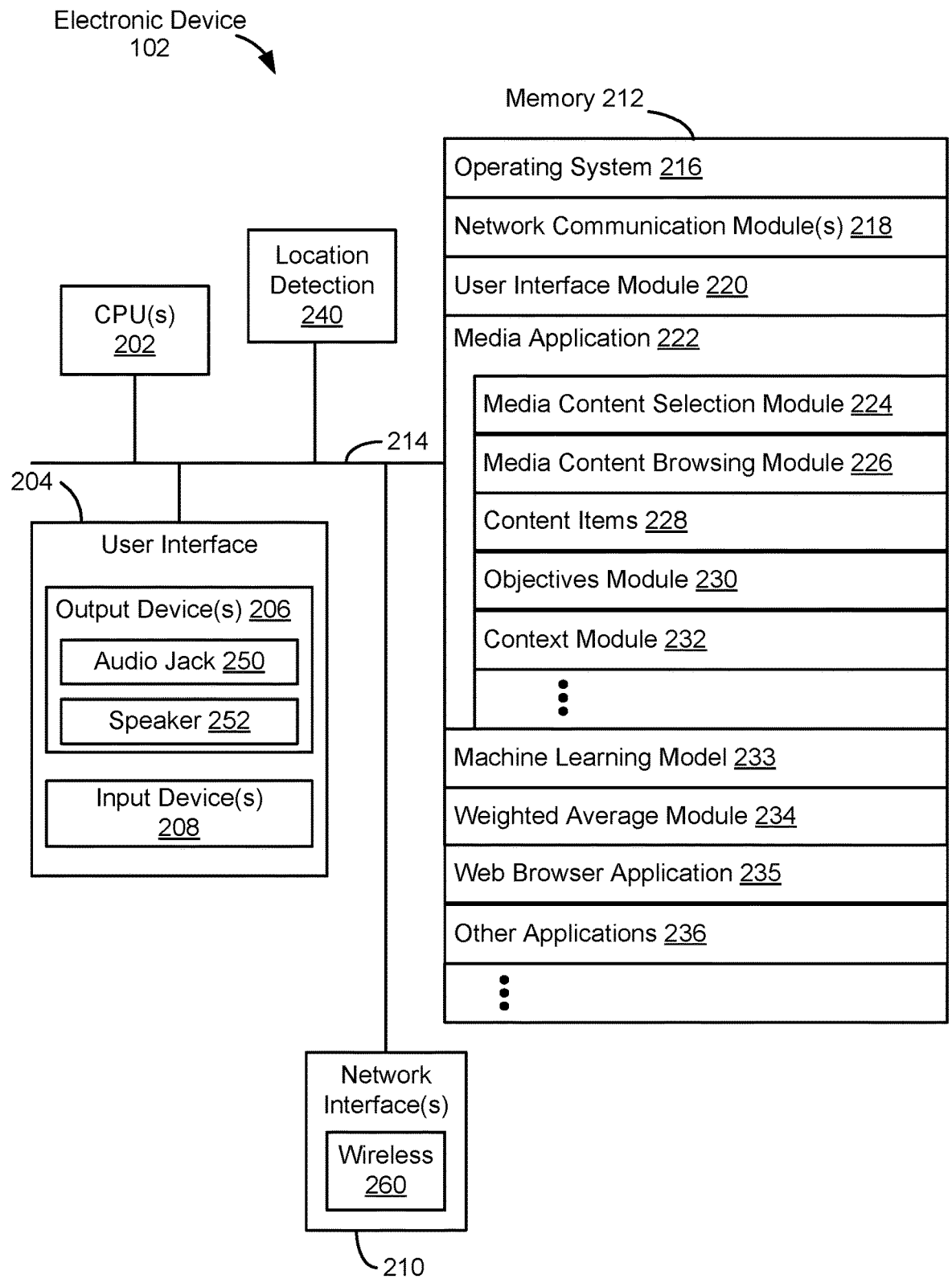
FIG. 2 is a block diagram illustrating a client device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206)

include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems 108, and/or or other wireless (e.g., Bluetooth-compatible) devices (e.g., for streaming audio data to the media presentations system 108 of an automobile). Furthermore, in some embodiments, the wireless interface 260 (or a different communications interface of the one or more network interfaces 210) enables data communications with other WLAN-compatible devices (e.g., a media presentations system 108) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

an operating system 216 that includes procedures for handling various basic system services and for performing hardware-dependent tasks;

network communication module(s) 218 for connecting the client device 102 to other computing devices (e.g., media presentation system(s) 108, media content server 104, and/or other client devices) via the one or more network interface(s) 210 (wired or wireless) connected to one or more network(s) 112;

a user interface module 220 that receives commands and/or inputs from a user via the user interface 204 (e.g., from the input devices 208) and provides outputs for playback and/or display on the user interface 204 (e.g., the output devices 206);

a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior with respect to media content. In some embodiments, media application 222 also includes the following modules (or sets of instructions), or a subset or superset thereof:

a media content selection module 224 for selecting one or more media content items and/or sending, to the media content server, an indication of the selected media content item(s);

a media content browsing module 226 for providing controls and/or user interfaces enabling a user to navigate, select for playback, and otherwise control or interact with media content, whether the media content is stored or played locally or remotely;

a content items module 228 for storing media items for playback and/or for forwarding requests for media content items to the media content server;

an objectives module 230 for determining and/or storing objectives from one or more parties, such as objectives of the user of the electronic device 102; and a context module 232 for determining current contextual information, such as from a playback history of a user, to be provided to a machine learning model;

a machine learning model 233 for determining scores for a plurality of objectives (e.g., tasks) between a user and a respective media content item;

a weighted average module 234 for determining ordered weighted averages for a plurality of objectives (e.g., tasks), and providing the values determined from the ordered weighted averages to media content selection module 224 for selecting media content based a web browser application 235 (e.g., Internet Explorer or Edge by Microsoft, Firefox by Mozilla, Safari by Apple, or Chrome by Google) for accessing, viewing, and interacting with web sites; and other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
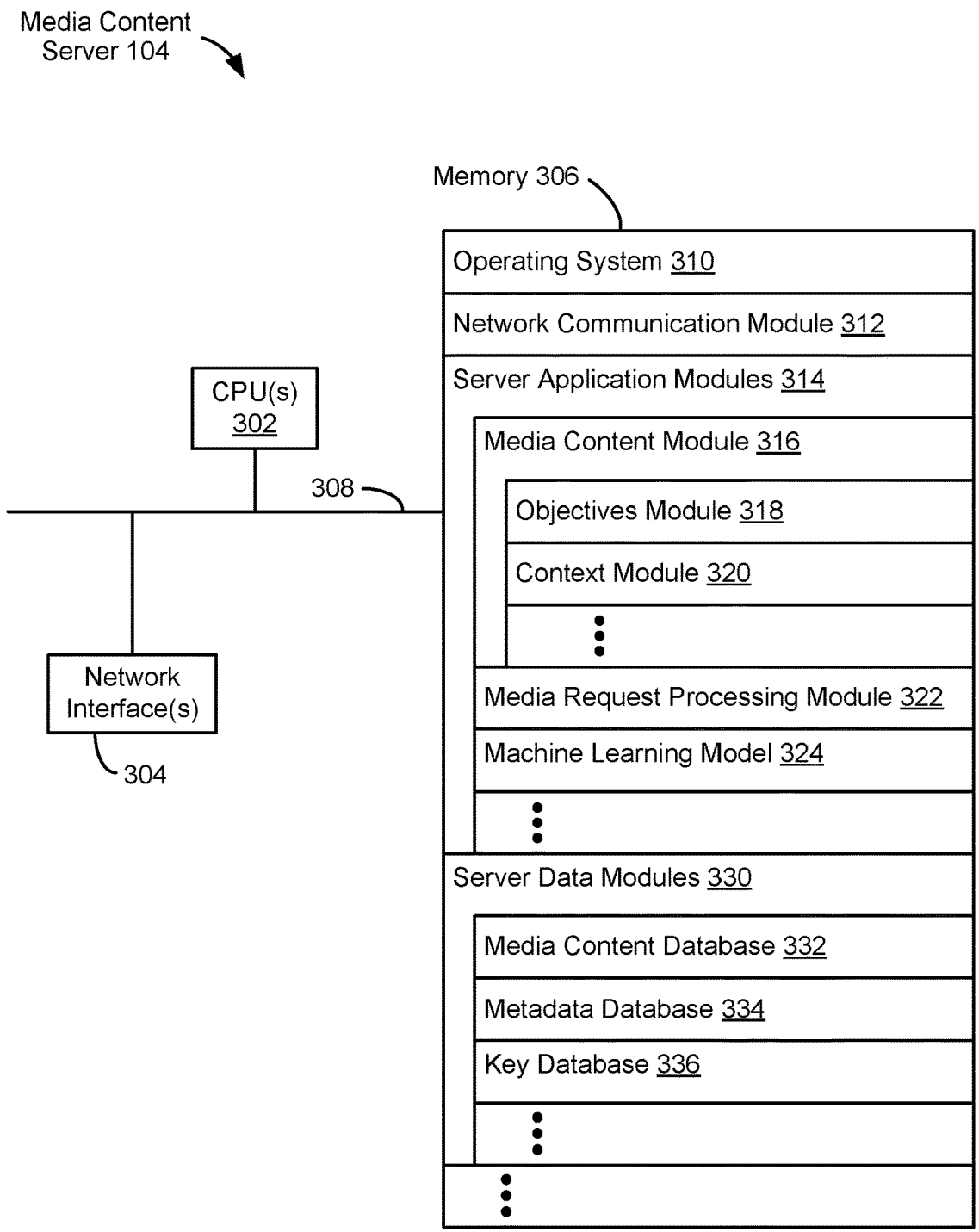
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
    - a media content module 316 for storing one or more media content items and/or sending (e.g., streaming), to the electronic device, one or more requested media content item(s), including but not limited to, one or more of:
        - an objectives module 318 for determining and/or storing objectives from one or more parties; and
        - a context module 320 for determining current contextual information, such as from a playback history of a user and/or matching current contextual information to previously recorded contextual information, to be provided to a multi-arm bandit model; and
    - a media request processing module 322 for processing requests for media content and facilitating access to requested media items by client devices (e.g., the client device 102) including, optionally, streaming media content to such devices and/or to one or more media presentation system(s) 108;
    - a machine learning model 324 for determining scores for a plurality of objectives (e.g., tasks) between a user and a respective media content item;
- one or more server data module(s) 330 for handling the storage of and/or access to media items and/or metadata relating to the media items; in some embodiments, the one or more server data module(s) 330 include:
    - a media content database 332 for storing media items;
    - a metadata database 334 for storing metadata relating to the media items; and
    - a key database 336 for storing keys related to account information for user media accounts, such as user profiles, credentials (e.g., user identifiers, passwords, email addresses, etc.), and/or identifiers of any linked accounts.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4:
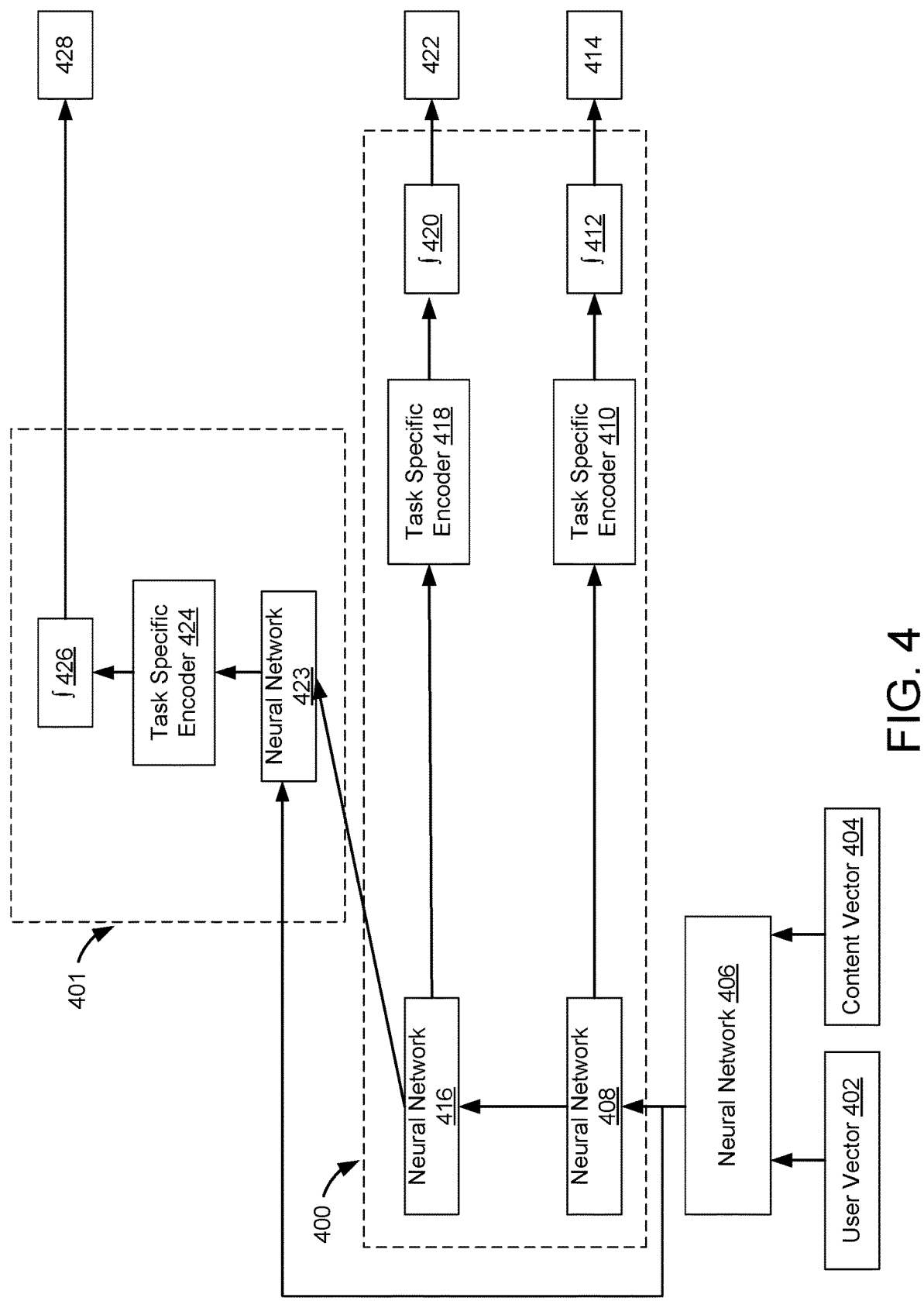
FIG. 4 is a block diagram of a multi-level machine learning algorithm, in accordance with some embodiments.

FIG. 4 is a block diagram of a multi-level machine learning algorithm. The system includes a first level 400 and a second level 401. Each level in the multi-level machine learning algorithm includes one or more neural networks. For example, first level 400 includes neural network 408 and neural network 416, and second level 401 includes neural network 423. In some embodiments, each a neural network comprises an encoder (and decoder) to encode the input sequence (e.g., referred to herein as an input) into a target sequence (e.g., referred to herein as an output).

In some embodiments, a media content provider, in providing recommendations to a user, predicts how a user is likely to engage with the media content item, by either streaming the media content item completely (e.g., consuming the entire media content item), or skipping the media content item before completing it. Further, users are provided with the option to mark the media content item as a favorite (e.g., heart) to indicate that they are satisfied with the media content item, or to ban (e.g., block) a media content item to indicate that they are not satisfied with the media content item. These types of user interactions correspond to different categories: engagement objectives and satisfaction objectives, respectively. The prediction model shown in FIG. 4 considers both types of these objectives for the media content provider (e.g., engagement objectives in first level 400 and satisfaction objectives in second level

401). In some embodiments, the media content provider calculates scores for these objectives to recommend media content for the user.

In some embodiments, engagement objectives and satisfaction objectives are closely related, and thus, it is beneficial to consider information about one objective when making a prediction for another objective. For example, information about one engagement objective would help the media content provider calculate another engagement objective, and the combined information about both engagement objectives helps the model learn more about user satisfaction (e.g., as satisfaction objectives). To this end, a hierarchy is provided between the objectives (also referred to as tasks) so that engagement objectives are determined at lower levels (e.g., level 400) of the architecture (e.g., in a supervised neural network) while satisfaction objectives are determined at higher layers (e.g., levels) of the machine learning algorithm (e.g., at a neural network in a higher level than the neural network(s) for the engagement objectives) (e.g., level 401). In some embodiments, satisfaction objectives are considered more complex than engagement objectives, and thus are placed in a higher level than engagement objectives. Other types of objectives may be considered more or less complex than engagement and/or satisfaction objectives. In some embodiments, the more complex objectives are associated with neural networks at higher levels than the neural networks of less complex objectives (e.g., such that information from the neural networks for less complex objectives are fed into the neural networks for the more complex objectives).

The model illustrated in FIG. 4 is trained end-to-end, using historic media content consumption data (e.g., streaming data stored in a playback history of a user). In some embodiments, the end-to-end training comprises back-propagating between each neural network (e.g., starting with the neural network in the highest level, level 401). In some embodiments, because the end-to-end training comprises back-propagating between each neural network, the multiple neural networks are not trained independently (e.g., the entire system is trained with the connections between neural networks in place, such that, during a training phase, the weights for each neural network of the multiple neural networks is updated in a respective iteration before the next feed-forward iteration). In some embodiments, this multi-task approach to predicting engagement and satisfaction that is provided performs better than developing single objective models for each of the objectives.

In some embodiments, the machine learning algorithm includes a first neural network (e.g., neural network 406) that receives input(s) that describe a user and a content item (e.g., of a plurality of content items). In some embodiments, the first neural network is considered as a zeroth level (e.g., distinct from the first level or the second level) in the hierarchical machine learning algorithm. In some embodiments, the first neural network 406 is included in first level 400 (not shown), rather than in its own zeroth level.

In some embodiments, the inputs to first neural network 406 include a user vector 402 and a content vector 404. User vector 402 describes features of the user, such as demographic information, taste profile information (e.g., the genre, artists, or types of media content the user prefers to consume, which can be based on a playback history of the user), playback history information (e.g., does the user tend to access media content at particular times of the day, use the shuffle feature, etc.), and any other information known about the user. Content vector 404 includes information about a respective media content item, such as tempo, genre, artist, playlist, and/or other descriptive features of the media content item.

The first neural network 406 uses the input vectors (e.g., user vector 402 and content vector 404) and outputs a first output. In some embodiments, the first output from the first neural network 406 is used as an input for a neural network in each level of the hierarchical machine learning algorithm. For example, neural network 408 in the first level of the machine learning algorithm uses the first output from neural network 406 as an input. Also, neural network 423 in the second level of the machine learning algorithm uses the first output from the neural network 406 as an input for the neural network 423.

In some embodiments, the multi-level machine learning algorithm calculates scores for the various objectives corresponding to a respective user and a respective media item. Each level calculates a score for one or more objectives (e.g., the score being for a particular user and a particular media item). The first level outputs two scores, score 414 and score 422, each score corresponding to a distinct objective. For example, score 414 corresponds to a skip prediction objective calculated using task specific encoder 410 (using mathematical function 412, which in some embodiments, sums the values of the output of task specific encoder 410) and score 422 corresponds to a completion objective calculated using task specific encoder 418 (using mathematical function 420 which in some embodiments, sums the values of the output of task specific encoder 418). In some embodiments, calculated score 414 does not directly affect the calculation of score 422 (e.g., score 414 is not an input to the calculation score 422). Instead, in some embodiments, the output of neural network 408 is used as an input to neural network 416. Within the first level 400, neural network 416 takes the output of neural network 408 as an input. Note that the output of neural network 408 is not task (or objective) specific. For example, task specific encoder 410 and the calculation of score 414 is distinct from, and does not affect, the output of neural network 408 (or the input to neural network 416). Thus, the scores 414 and 422, are both calculated in the first level 400, but are not dependent on each other. Similarly, the scores calculated in the first level are not used as inputs to the neural network 423 in the second level 401.

The second level 401 outputs a score 428 for an objective corresponding to task specific encoder 424. For example, a mathematical function 426 (e.g., summation) is applied to the output of task specific encoder 424 to generate score 428. The neural network 423 takes, as inputs, the output from the first level (e.g., the output of neural network 416) and the output from the zeroth level (e.g., the output of neural network 406).

In some embodiments, the hierarchical machine learning algorithm illustrated in FIG. 4 is applied to each media content item in a plurality of media content items (e.g., where the inputs, content vector 404 and optionally user vector 402, are updated for each media content item). Since each score (e.g., score 414, score 422, and score 428) calculated in FIG. 4 represents a prediction of the respective objective for a respective media content item (e.g., corresponding to input vector) and the user, the scores for the respective objectives can be combined or otherwise used to select which media content item to present (e.g., recommend) to the user. For example, the media content provider can select a single objective, and compare the scores for the single objective for each media content item to select media content (e.g., the media content item with the highest score for the single objective). In some embodiments, for each media content item, the scores for each objective are used to calculate an ordered weighted average (OWA) for the plurality of objectives, as described with reference to FIGS. 5A-5B and FIGS. 7A-7B.

In some embodiments, the objectives are grouped into "levels" based on the type of objective. For example, predictive objectives that are used to measure a prediction of user behavior with respect to media content are grouped in the first level 400. For example, prediction objectives include a prediction that a user will skip a media content item (e.g., the user will consume less than a predetermined amount of time of the media content item, such as 10 seconds). A prediction objective also includes, for example, a prediction that a user with complete a media content item (e.g., the user will consume more than a predetermined amount of the media content item, such as 90% of the media content item, as measured by the length of the media content item). In some embodiments, engagement objectives that are used to measure the satisfaction of a user with media content items are grouped in the second level 401.

In some embodiments, each objective is considered its own level in the hierarchical machine learning algorithm. For example, in some embodiments, the calculation of score 414 is the first level, and the calculation of score 422 is a second level distinct from the first level. For purposes of illustration, FIG. 4 shows the calculation of score 414 and the calculation of score 422 within the same level (e.g., the first level 400). However, it would be understood by one of ordinary skill in the art that these objectives (and scores) could each correspond to distinct levels.

Figure 5A:
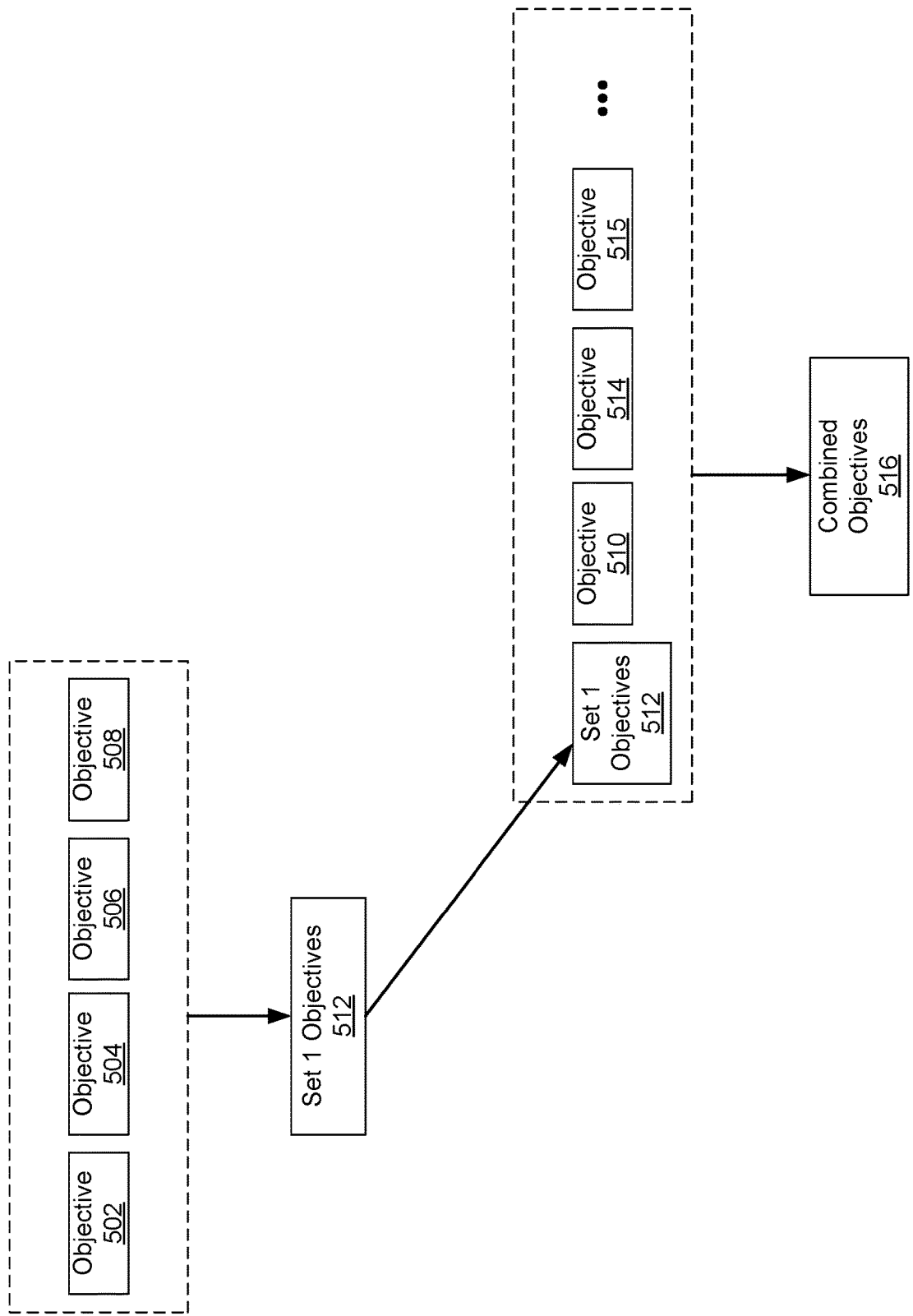

FIGS. 5A-5B are block diagrams illustrating hierarchical ordered weighted averaging for a plurality of objectives (referred to below as criteria). In order to determine the appropriateness of a particular media content item (referred to below as an alternative, x), as the solution (e.g., the media content item to recommend or provide to the user), its scores for the various objectives are aggregated using an ordered weighted average to find some overall, single value to associate with the media content item. Ordered weighted average functions (OWA functions) are aggregation functions that associate weights with the value of each input (instead of associating weights with a particular input). In this way, OWA functions differ from weighted arithmetic means in that the weights for OWA functions are not a priori associated with the particular inputs, but are associated with particular inputs based on the relative magnitude of the inputs (e.g., a first weight is applied to the highest-valued input, a second weight is applied to the second highest-valued input, and so on). Thus, the importance of an input is determined by its value. For example, when selecting recommendations using several satisfaction criterion (e.g., relevance, popularity, artist affinity), the largest input (the highest satisfaction criterion) is the most important, regardless of whichever specific one it is. The procedure involves three main steps: (i) specifying a quantifier, Q, (ii) generating a set of order weights associated with Q, and (iii) computing the overall evaluation for each alternative (e.g., where, in some embodiments, each alternative is a media content item that could be recommended to a user) by means of the OWA combination function. Given a weighting vector w, the OWA function is:

$$OWA_w(x) = \sum_{i=1}^{n} w_i x_{(i)} = <w, x_\searrow>,$$

where w is the weighting vector, x is the input vector, and $x_\searrow$ is the vector obtained from x by arranging its components in non-increasing order (e.g., from the greatest value of x to the least value of x). Note that calculation of the value of the OWA function can be done by using a sort( ) operation. If all weights are equal, OWA becomes an arithmetic mean.

OWA functions are symmetric aggregation functions that allocate weights according to the input value. Thus, OWA can emphasize the largest, the smallest or mid-range inputs (in other words, the weight applied to the highest value need not be the largest weight). Thus, in the OWA aggregation, the weights are not associated with a particular argument but with the ordered position of the arguments. The quantifier is used to generate an OWA weighting vector W of dimension n (e.g., where n is the number of inputs to be weighted). This weighting vector is then used in an OWA aggregation to determine the overall evaluation for each alternative. For each alternative, the argument of this OWA aggregation is the satisfaction of the alternative to each of the criteria (e.g., where the satisfaction of the alternative to each of the criteria is the score for each objective, as discussed elsewhere in this document).

In some embodiments, the quantifier is a Regular Increasing Monotone (RIM) quantifier, which implies that the solution improves as more criteria are satisfied:

$$w_i = Q\left(\frac{i}{n}\right) - Q\left(\frac{i-1}{n}\right).$$

The Regular Increasing Monotone (RIM) quantifier can provide information aggregation procedures guided by verbally expressed concepts (e.g., linguistic quantifiers, that are able to express the concept of fuzzy majority: "for all", "there exists", "identity", "most", "at least half", "as many as possible") and a dimension independent description of the desired aggregation. A fuzzy subset Q of the real line is called a Regular Increasing Monotone (RIM) quantifier if $Q(0)=0$, $Q(1)=1$ and $Q(x) \geq Q(y)$ if $x>y$.

Some parameterized RIM quantifier families $Q(x, \alpha)$ are discussed where parameter $\alpha$ determines the "or"-ness level of these quantifiers, which serves as the control parameter in the aggregation process. Although the class of proportional quantifiers known as the regular increasing monotone (RIM) quantifiers is described here, it will be understood that other types of quantifiers can also be used. To identify the quantifier some embodiments employ a method for defining a parameterized subset on the unit interval. For example, $$Q(p)=p^\alpha (\alpha>0)$$

where Q(p) is represented as a fuzzy set in interval [0, 1]. It can be applied for generating a whole family of the RIM quantifiers. By changing the parameter, $\alpha$, one can generate different types of quantifiers and associated operators between the two extreme cases of the all and at least one quantifiers. For $\alpha=1$, Q(p) is proportional to $\alpha$ and therefore it is referred to as the identity quantifier. As $\alpha$ tends to zero, the quantifier Q(p) approaches its extreme case of at least one, which corresponds to the MAX operator. As $\alpha$ tends to infinity, the quantifier Q(p) approaches its extreme case of all, which corresponds to the MIN operator. The OWA operator can be used in multiple levels, so as to form a hierarchical ordering across multiple objectives.

Depending on the value of $\alpha$, OWA can give high weights to (i) sets of objectives that have many high objective scores (OWA_MANY), which works like an "AND" operator, or (ii) sets of objectives that have any high objective scores (OWA_ANY), which works like an "OR" operator, or anything in between (depending on the value of alpha). For example, for a low value of alpha (e.g., OWA_ANY), a high weight is given to the entire set of objectives if at least one of the objective scores is high. In another example, for a high value of alpha, the OWA calculation acts like an "AND" operator, where the set of objectives is assigned a high weight value only when many of the objective scores are high.

Hierarchical Ordered Weighted Average (HOWA) is an expansion of OWA. Objectives are grouped into different Objective Sets and the weight outputs from OWA calculations (either OWA_MANY, or OWA_ANY) are used as inputs to another OWA calculation. In some embodiments, the Objective Sets are treated as individual objectives. For example, OWA outputs are recursively used as new OWA inputs. The "hierarchical" part of HOWA is where the output of different OWA results are then used as the input to another OWA calculation. This could be many-leveled, although FIGS. 5A-5B show two-leveled examples.

In this way, for a media content provider selecting content to recommend to users, HOWA combines multiple objectives that support user satisfaction (e.g., user-satisfaction, track affinity, and artist affinity) in a way that is more complex than using simple averaging or weighted sums. For example, a user is satisfied with different media content for different reasons, including, familiarity with the content item, familiarity with the artist, how the media content fits with the other media content that is recently played (e.g., in the rest of the playlist), etc. Thus, it is important to score a user's satisfaction (e.g., affinity) with a media content item that accounts for this plurality of reasons (e.g., objectives).

In FIG. 5A, a first ordered weighted average is applied to a first set of objectives, resulting in a score (e.g., equal to the calculated OWA) for set 1 objectives 512. For example, each objective in the first set of objectives (e.g., objective 502, objective 504, objective 506 and objective 508) has a value. The objectives are ordered by their value (e.g., from largest value to smallest value). For example, objective 502 (e.g., user-satisfaction objective) has a value of 0.8, objective 504 (e.g., noise objective) has a value of 0.3, objective 506 (e.g., track-affinity objective) has a value of 0.9, and objective 508 (e.g., artist-affinity objective) has a value of 0.8. Thus, the order, from greatest value to least value, is: objective 506, objective 502 and objective 508, and objective 504, thus producing an ordered value vector [0.9, 0.8, 0.8, 0.3].

Next, weights are assigned to each objective, based on their order, such that the objective with the largest value also is assigned the first weight (e.g., the largest weight, although that need not be the case), and the objective with the second-to-largest value applies the second weight (e.g., the second-to-largest weight), and so on. For example, where the weight (w), for each position (alternative) i, is calculated using:

$$w_i = Q\left(\frac{i}{n}\right) - Q\left(\frac{i-1}{n}\right),$$

as explained above.

An OWA is then calculated for the first set of objectives (e.g., to produce a score for set 1 objectives 512). For example, OWA_MANY (e.g., an "AND" operator) is applied to the first set of objectives (e.g., objective 502, objective 504, objective 506 and objective 508). A score for set 1 objectives 512 is determined by computing the weighted sum of the OWA weights multiplied by the objective values for the objectives in the first set. Thus, the OWA is calculated by taking the weighted sum of the OWA weights $[w_1, w_2, w_3, w_4]$ applied to the value vector [0.9, 0.8, 0.8, 0.3] (e.g., by multiplying each value by its corresponding weight, and then summing the weighted values). By applying an OWA_ANY calculation (e.g., with a high value for $\alpha$), the resulting OWA (e.g., score) is, for example, 0.89 for the first set of objectives.

As illustrated by this example, each objective in the set is assigned a weight based on its value (e.g., relative to the values of the other objectives), instead of assigning a weight to a particular objective. For example, if the value of an objective is updated (e.g., changed), the order of objectives is also updated, and the weights assigned to each objective is updated accordingly.

The computed score of the first set of objectives (e.g., 0.89) then becomes the value for the first set of objectives when the first set of objectives is used in the second OWA calculation. For example, set 1 objectives 512 (e.g., with a value of 0.89) becomes an objective within objective set 2 (e.g., which also includes additional objectives 510, 514, and 515).

A second ordered weighted average is applied to the second set of objectives to determine combined objectives 516, wherein the second set of objectives includes the result set 1 objectives 512 and additional objectives (e.g., single objectives), including objective 510, objective 514, and objective 515. In some embodiments, the value of objective 510 is determined by the machine learning model, described with reference to FIG. 4. In some embodiments, the value of objective 510 is a preset objective (e.g., with a set value) that is determined and provided without using the machine learning model.

The second OWA is then applied to the second set of objectives (e.g., including set 1 objectives 512, objective 510, objective 514, and objective 515). For example, an OWA_ANY ("OR") (e.g., with a low value for $\alpha$) is calculated for the second set of objectives. To calculate the OWA for the second set of objectives, the objectives in set 2 are now ordered (e.g., from greatest to least), each objective is assigned a weight, and the OWA is calculated by multiplying the respective weight by the respective objective in the second set to output a value (e.g., OWA) of the second set of objectives. For example, set 1 objectives has a value of 0.89 (e.g., as calculated above), objective 510 has a value of 0.1, objective 514 has a value of 0.4, and objective 515 has a value of 0.2. Thus, the ordered value vector, from greatest value to least, comprises: set 1 objectives, objective 514, objective 515, and objective 510, with values [0.89, 0.4, 0.2, 0.1] to be assigned weights $[w_5, w_6, w_7, w_8]$. Because this is an "OWA_ANY" calculation, and at least one objective has a high value, the overall score for combined objectives 516 is also high with a value of 0.82.

Taking the overall score for the combined objectives as 0.82 for this media content item (e.g., a first media content item), this score is then used by the media content provider to determine whether or not to recommend the first media content item. For example, if the first media content item has a score of 0.82, and a second media content item has a score of 0.6, the media content provider will recommend the first media content item over the second media content item because it has the larger score.

FIG. 5B illustrates another example of calculating a hierarchical ordered weighted average (HOWA). For example, a score is calculated for set 1 objectives 536 by calculating an ordered weighted average of objective 520, objective 522, objective 524, and objective 526. A score is calculated for set 2 objectives 538 by calculating an ordered weighted average of objective 528, objective 530, objective 532, and objective 534.

Next, at a second level within the hierarchy of ordered weighted averages, the scores for set 1 objectives 536 and set 2 objectives 538 are combined by calculating an OWA of set 1 objectives 536 and set 2 objectives 538. In the second level of the hierarchy, another OWA is calculated by combining the ordered weighted average of set 1 objectives 536 and the ordered weighted average of set 2 objectives 538 (and any other objectives or ordered weighted average of other sets of objectives), to determine a score for combined objectives 540 (e.g., where the score for combined objectives 540 is the OWA that is calculated using the score of set 1 objectives 536 and the score of set 2 objectives 538). Thus, the ordered weighted average is hierarchical because the system calculates an OWA based on the values for set 1 objectives 536 and set 2 objectives 538, where each of those values were also determined by calculating the OWA for the set 1 objectives 536 and calculating the OWA for the set 2 objectives 538.

It will be understood that for any of the OWA calculations described, OWA_MANY or OWA_ANY may be applied depending on the value chosen for the parameter α.

In some embodiments, the objectives include different types of objectives, such as engagement objectives (e.g., user clicks, complete listens, skips), satisfaction objectives (e.g., hears and hands, percentage streamed), content characteristic objectives (e.g., relevance, user-track genre similarity, artist and genre affinity), and platform objectives (e.g., strategic value of content to platform or artist). These objectives comprise a mix of computed and predicted estimates, with the predicted estimates (e.g. engagement criterion) being the output of sophisticated large-capacity models trained specifically for these tasks (as explained with reference to FIG. 4).

In some embodiments, a hierarchical ordered weighted average is computed for each media content item in a plurality of media content items. The score that is calculated (e.g., combined objectives 516 or combined objectives 540) for each media content item is then used to rank the media content items in the plurality of media content items. For example, the media content items with the highest scores are ranked highest.

In some embodiments, the media content items with the highest ranking(s) are selected to be presented to the user. In some embodiments, the plurality of media content items are ordered, for playback, according to the combined objective score (e.g., from the largest score to the smallest score). In some embodiments, the combined objective score for each media content item in the plurality of media content items is calculated using a same hierarchical ordered weighted average structure (e.g., a first OWA calculated using OWA_ANY and a second OWA calculated using OWA_MANY).

Figure 6A:
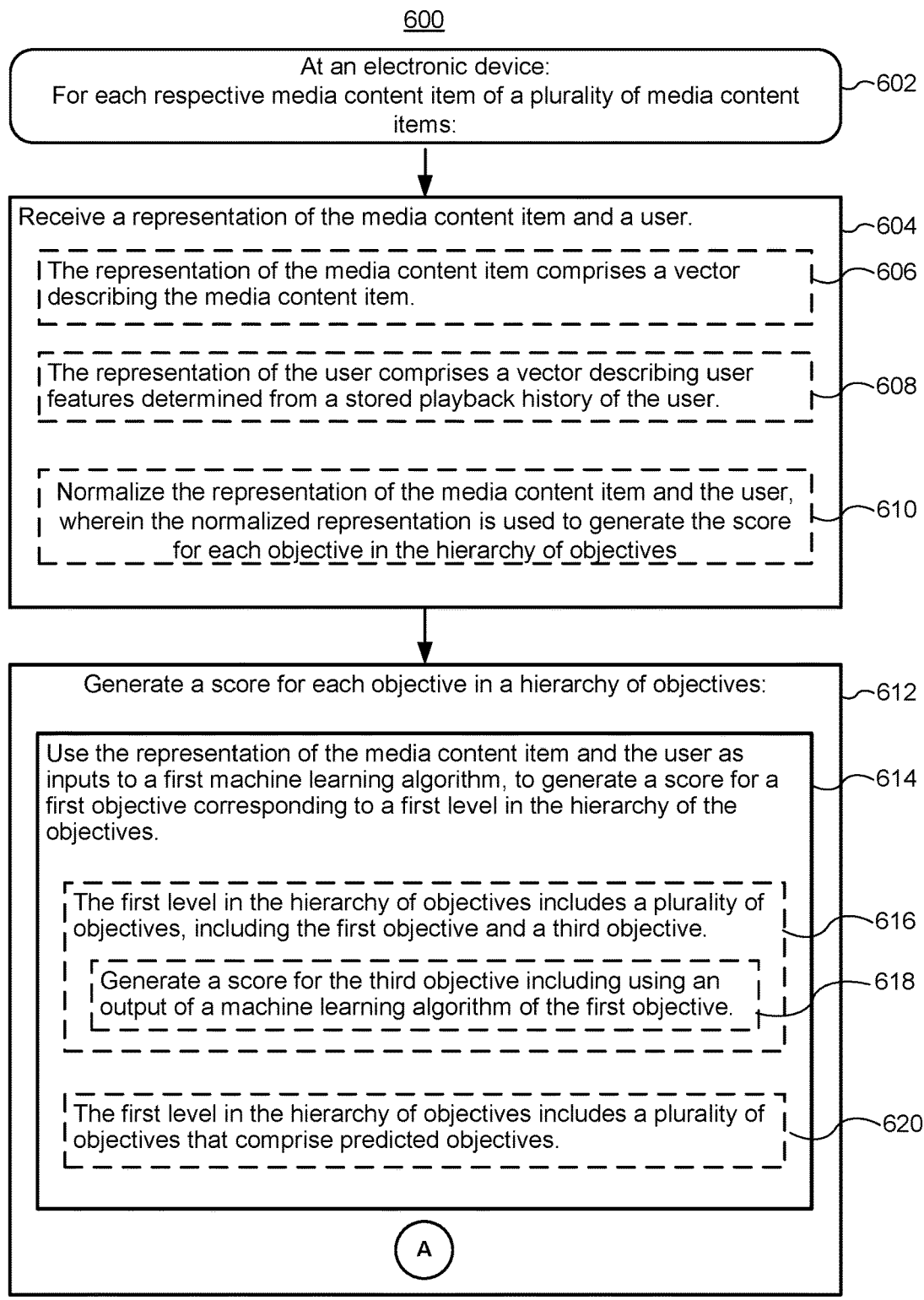
FIGS. 6A-6B are flow diagrams illustrating a method of providing media content to a user, in accordance with some embodiments.
Figure 6B:
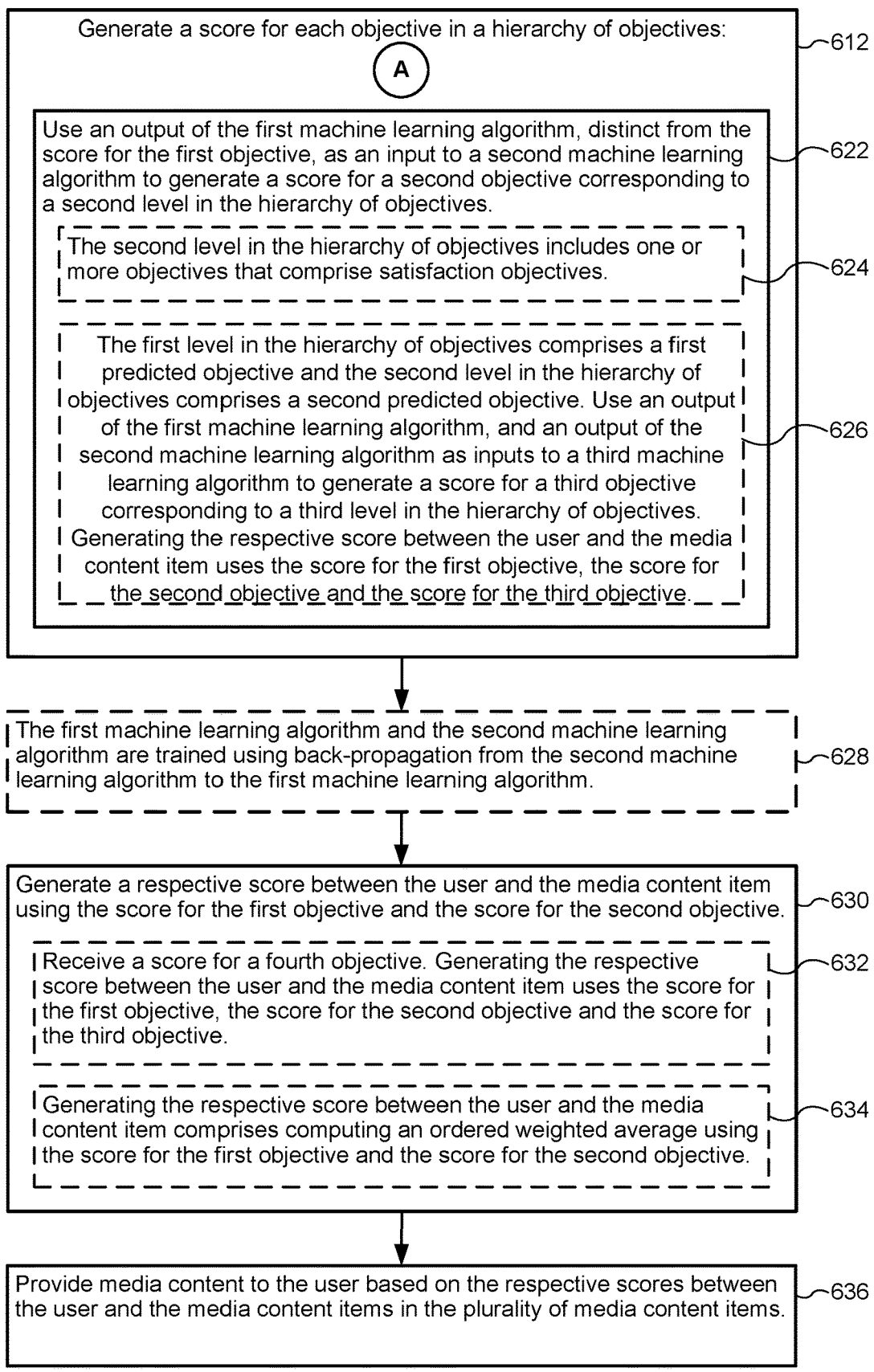

FIGS. 6A-6B are flow diagrams illustrating a method 600 for providing media content to a user, in accordance with some embodiments. Method 600 may be performed (602) at an electronic device (e.g., electronic device 102-1), the electronic device having one or more processors and memory storing instructions for execution by the one or more processors. In some embodiments, the method 600 is performed by executing instructions stored in the memory (e.g., memory 212, FIG. 2) of the electronic device. In some embodiments, the method 600 is performed by a combination of the server system (e.g., including media content server 104 and CDN 106) and an electronic device (e.g., a client device). In some embodiments, the server system provides tracks (e.g., media items) for playback to the electronic device(s) 102 of the media content delivery system 100.

Referring now to FIG. 6A, in performing the method 600, the electronic device, for each respective media content item of a plurality of media content items (602) receives (604) a representation of the media content item and a user.

In some embodiments, the representation of the media content item comprises (606) a vector describing the media content item. For example, as illustrated in FIG. 4, content vector 404 is a representation of a media content item that is fed as an input into neural network 406. In some embodiments, the vector describing the media content item includes information for the media content item such as genre, artist, playlist, tempo, or other identifying or characteristic information of the media content item.

In some embodiments, the representation of the user comprises (608) a vector describing user features determined from a stored playback history of the user. For example, user vector 402 is a representation of the user that includes information about the user as determined from a playback history of the user and/or a profile (e.g., demographics) of the user. In some embodiments, the representation of the user is updated after each media content item the user consumes (e.g., the playback history is updated to include the media content item). In some embodiments, the representation of the user is determined at the beginning of a playback session for that playback session. For example, the representation of the user includes characteristic related to the user and the playback conditions (e.g., time of day, location, etc.) for the current playback session.

In some embodiments, the electronic device normalizes (610) the representation of the media content item and the user, wherein the normalized representation is used to generate the score for each objective in the hierarchy of objectives. In some embodiments, the normalization is performed such that each objective has a similar distribution of scores (e.g., so that within the weighted average, each objective is more likely to effect the weighted average in a same way).

The electronic device generates (612) a score for each objective in a hierarchy of objectives. Generating the score for each objective comprises using (614) the representation of the media content item and the user as inputs to a first machine learning algorithm, to generate a score for a first objective corresponding to a first level in the hierarchy of the objectives. For example, as illustrated in FIG. 4, a score 414 is generated for a first objective (corresponding to task specific encoder 410) within first level 400.

In some embodiments, the first level in the hierarchy of objectives includes (616) a plurality of objectives, including the first objective and a third objective. In some embodiments, the first level includes a third objective, such that the third objective and the first objective are in the first level in the hierarchy of objectives, wherein the first objective and the third objective are a same type of objective. In some embodiments, each objective has a corresponding machine learning algorithm (e.g., neural network). In some embodiments, the first level includes a plurality of machine learning algorithms, and a corresponding plurality of objectives determined in the first level. For example, as illustrated in FIG. 4, the first level 400 includes a neural network 408, and a task specific encoder 410 for a first objective (to generate score 414 for the first objective) and the first level 400 includes a neural network 416, and a task specific encoder 418 for a third objective (to generate score 422 for the third objective).

In some embodiments, the electronic device generates (618) a score for the third objective including using an output of a machine learning algorithm of the first objective (without using the score for the first objective). For example, in FIG. 4, the score 422 for the third objective is generated from neural network 416, where neural network 416 takes the output of neural network 408 as an input. Neural network 416 does not take score 414 as an input.

In some embodiments, the first level in the hierarchy of objectives includes (620) a plurality of objectives that comprise predicted objectives (e.g., a skip prediction objective, a track completion objective, etc.).

Generating the score for each objective comprises using (622) an output of the first machine learning algorithm, distinct from the score for the first objective, as an input to a second machine learning algorithm to generate a score for a second objective corresponding to a second level in the hierarchy of objectives. For example, score 428 is generated in second level 401, using neural network 423. Neural network 423 uses (i) an output of neural network 416 (from the first level) and (ii) an output of neural network 406 as inputs to the neural network 423. Thus, the score 428 is generated in the second level in the hierarchy of objectives using an output of neural network 416 as an input (where score 422 is determined using mathematical function 420, which is distinct from the output of neural network 416).

In some embodiments, the second level in the hierarchy of objectives includes (624) one or more objectives that comprise satisfaction objectives. For example, a satisfaction objective comprises whether a user will favorite (e.g., heart) a media content item and/or ban (e.g., block) a media content item. In some embodiments, the score for the satisfaction objective represents the likelihood that the user will favorite and/or ban the media content item.

In some embodiments, the first level in the hierarchy of objectives comprises a first predicted objective and the second level in the hierarchy of objectives comprises (626) a second predicted objective. In some embodiments, the electronic device uses an output of the first machine learning algorithm, and an output of the second machine learning algorithm as inputs to a third machine learning algorithm to generate a score for a third objective corresponding to a third level in the hierarchy of objectives. In some embodiments, generating the respective score between the user and the media content item uses the score for the first objective, the score for the second objective and the score for the third objective. For example, each level in the hierarchy comprises a single objective.

The first machine learning algorithm and the second machine learning algorithm are trained (628) using backpropagation from the second machine learning algorithm to the first machine learning algorithm. The electronic device generates (630) a respective score between the user and the media content item using the score for the first objective and the score for the second objective.

In some embodiments, the electronic device receives (632) a score for a fourth objective, and generating the respective score between the user and the media content item uses the score for the first objective, the score for the second objective and the score for the third objective. In some embodiments, the score for the fourth objective comprises an estimated objective. In some embodiments, an estimated objective is an objective that has a score that is not determined using the machine learning algorithm (e.g., neural networks).

In some embodiments, generating the respective score between the user and the media content item comprises (634) computing an ordered weighted average using the score for the first objective and the score for the second objective. For example, as explained with reference to FIGS. 5A-5B, the scores of the plurality of objectives are combined using ordered weighted averaging to generate a single value (e.g., to represent an affinity between the user and the media content item).

The electronic device provides (636) media content to the user based on the respective scores between the user and the media content items in the plurality of media content items. For example, providing the media content comprises selecting media content based on the respective scores, as described with reference to steps 730-734 in FIG. 7B.

Although FIGS. 6A-6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Figure 7A:
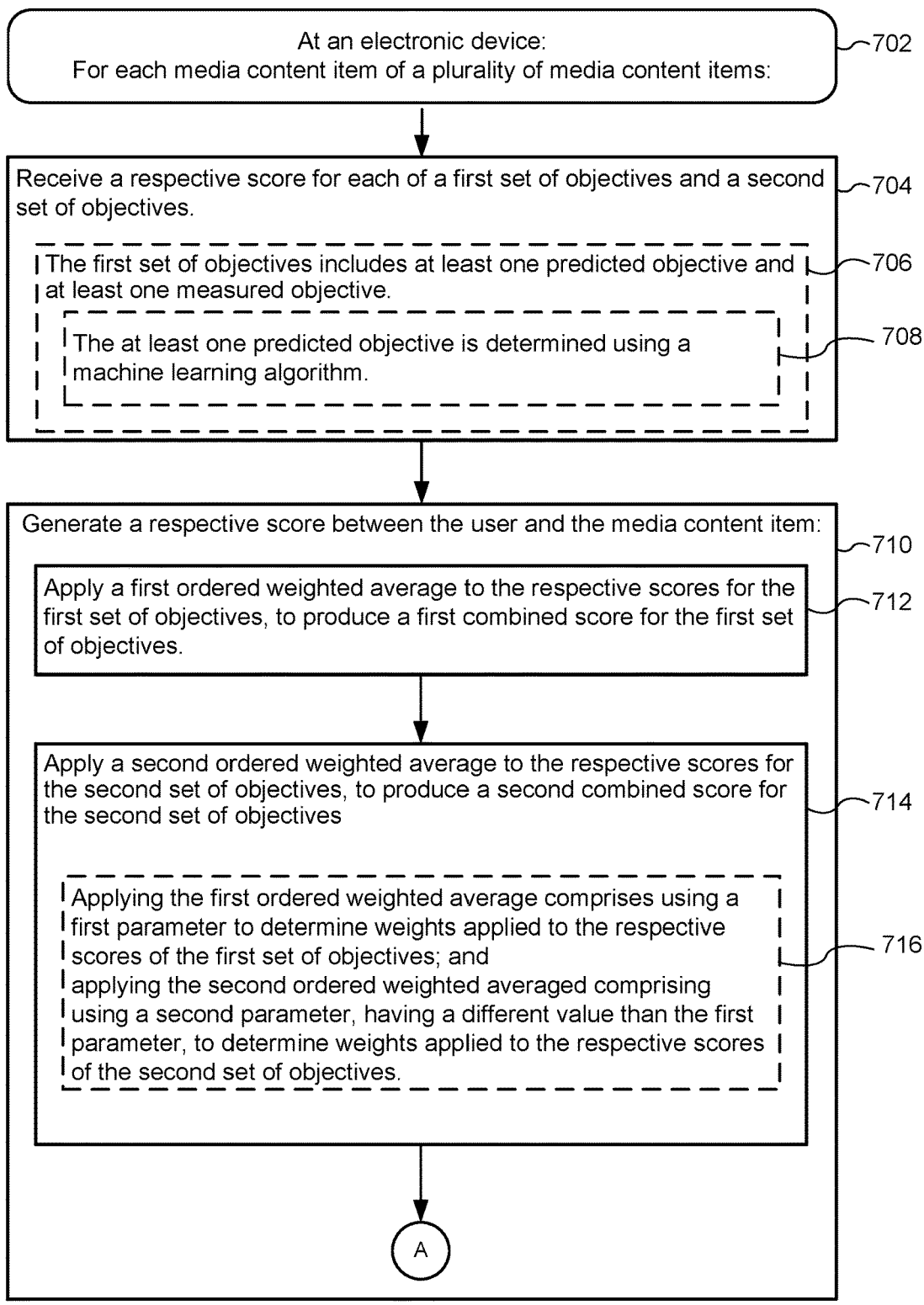
FIGS. 7A-7B are flow diagrams illustrating a method of providing media content to a user, in accordance with some embodiments.
Figure 7B:
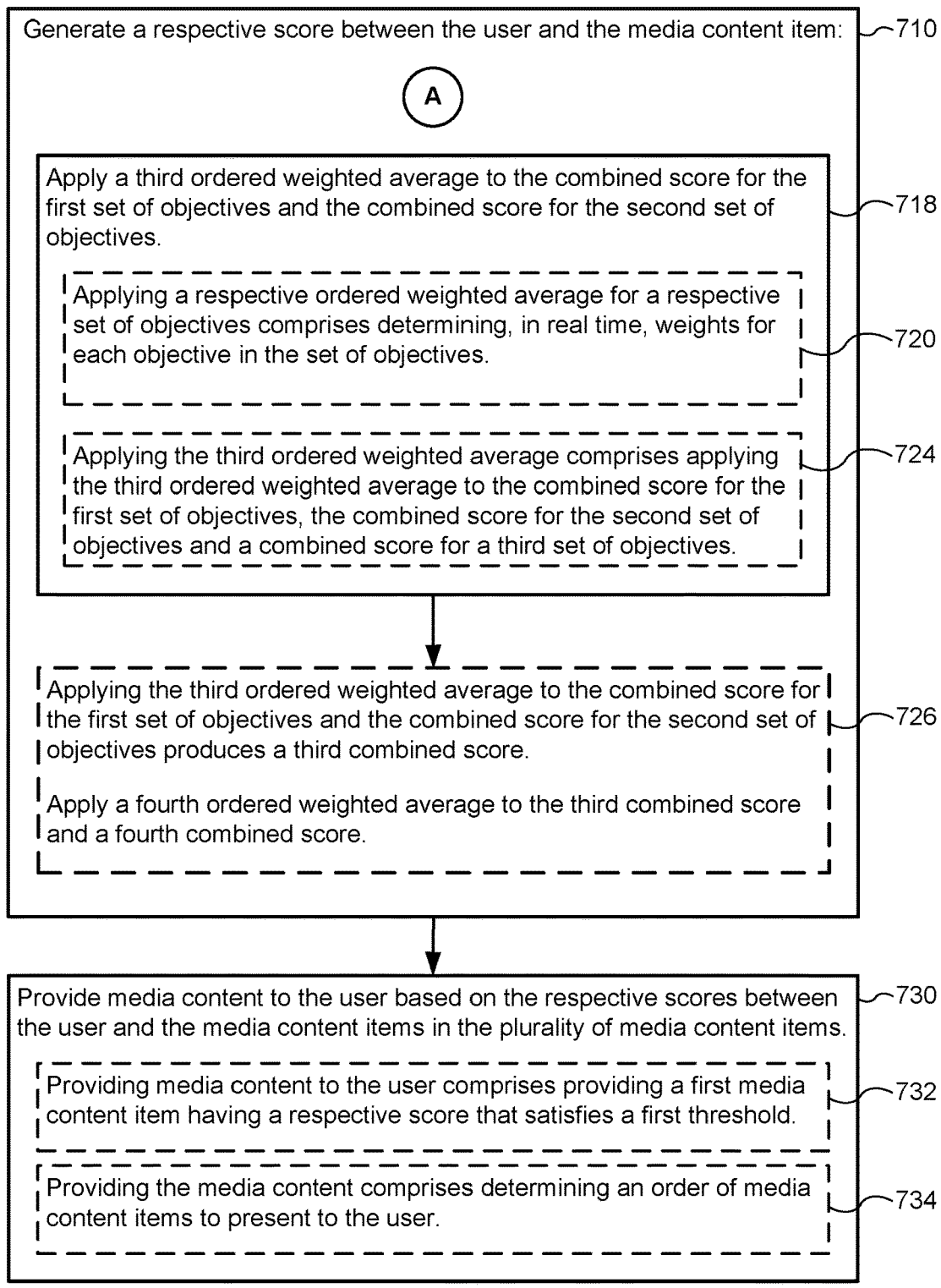

FIGS. 7A-7B are flow diagrams illustrating a method 700 for providing media content to a user, in accordance with some embodiments. Method 700 may be performed (502) at an electronic device (e.g., electronic device 102-1), the electronic device having one or more processors and memory storing instructions for execution by the one or more processors. In some embodiments, the method 700 is performed by executing instructions stored in the memory (e.g., memory 212, FIG. 2) of the electronic device. In some embodiments, the method 700 is performed by a combination of the server system (e.g., including media content server 104 and CDN 106) and an electronic device (e.g., a client device). In some embodiments, the server system provides tracks (e.g., media items) for playback to the electronic device(s) 102 of the media content delivery system 100.

Referring now to FIG. 7A, the electronic device performs the method 700 for each media content item of a plurality of media content items (702). The electronic device receives (704) a respective score for each of a first set of objectives and a second set of objectives.

In some embodiments, the first set of objectives includes (706) at least one predicted objective and at least one measured objective. In some embodiments, the at least one predicted objective is determined (708) using a machine learning algorithm.

The electronic device generates (710) a respective score between the user and the media content item. For example, a combined score (e.g., a score for combined objectives 516 or a score for combined objectives 540) is generated for each media content item of the plurality of media content items.

Generating the respective score includes applying (712) a first ordered weighted average to the respective scores for the first set of objectives, to produce a first combined score for the first set of objectives. For example, as illustrated in FIG. 5B, a first OWA is applied to a first set of objectives (e.g., objectives 520, 522, 524 and 526) to generate a first combined score for set 1 objectives 536.

Generating the respective score includes applying (714) a second ordered weighted average to the respective scores for the second set of objectives, to produce a second combined score for the second set of objectives. For example, as illustrated in FIG. 5B, a second OWA is applied to a second set of objectives (e.g., objectives 528, 530, 532, and 534) to produce a second combined score for set 2 objectives 538.

In some embodiments, applying the first ordered weighted average comprises (716) using a first parameter to determine weights applied to the respective scores of the first set of objectives. In some embodiments, applying the second ordered weighted averaged comprising using a second parameter, having a different value than the first parameter, to determine weights applied to the respective scores of the second set of objectives. For example, as explained above, the parameter α is updated to change the calculated quantifier, Q(p), which controls whether the OWA will be calculated using an AND operator (e.g., OWA_MANY) or an OR operator (e.g., OWA_ANY). In some embodiments, a first level in the HOWA function uses a first operator (e.g., AND operator) and a second level in the HOWA function uses a second operation (e.g., OR operator). It will be understood that different operators can be applied to different levels of the HOWA function, or a same operator can be applied to each level of the HOWA function.

In some embodiments, the weights applied to each objective in a respective set of objectives are not equal (e.g., not an arithmetic mean).

Generating the respective score includes applying (718) a third ordered weighted average to the combined score for the first set of objectives and the combined score for the second set of objectives. For example, as illustrated in FIG. 5B, a third OWA is applied to combine the score for set 1 objectives 536 and set 2 objectives 538 to generate the score for combined objectives 540.

In some embodiments, applying a respective ordered weighted average for a respective set of objectives comprises (720) determining, in real time, weights for each objective in the set of objectives. For example, as explained above, the weight for each objective is dynamically calculated based on the value assigned to the respective objective. For example, the assigned weight is based on the respective value for the respective objective (e.g., rather than a particular weight always being assigned to a particular objective). In this way, in some embodiments, each objective in the set of objectives that is combined using the ordered weighted average is dynamically weighted such that a same objective is assigned a different weight for each media content item (e.g., the weight for a respective objective is not fixed). For example, an affinity objective is assigned a higher weight for a first media content item and the same affinity objective is assigned a lower weight for a second media content item. In some embodiments, the weights are not manually specified, and the scores are estimated in real-time (dynamically) based on the contextual predictions of objectives (e.g., where the value of the objective is determined by contextual predictions, such as the machine learning algorithm described with reference to FIG. 4).

In some embodiments, applying the third ordered weighted average comprises (724) applying the third ordered weighted average to the combined score for the first set of objectives, the combined score for the second set of objectives and a combined score for a third set of objectives. For example, a plurality of objectives are combined in a same level (e.g., 3 scores are combined in 1 level), as illustrated in FIG. 5A.

In some embodiments, applying the third ordered weighted average to the combined score for the first set of objectives and the combined score for the second set of objectives produces (726) a third combined score. In some embodiments, the electronic device applies a fourth ordered weighted average to the third combined score and a fourth combined score. For example, as illustrated in FIG. 5B, a second level in the hierarchy uses the output of the first level (i.e., the third combined score) and another score.

The electronic device provides (730) media content to the user based on the respective scores between the user and the media content items in the plurality of media content items. In some embodiments, the media content is provided to the user by changing an order of media content items to be presented for a radio session, a playlist, or a shuffle session. In some embodiments, providing media content to the user comprises (732) providing a first media content item having a respective score that satisfies a first threshold. In some embodiments, the first threshold is defined as a score such that a predetermined number of media content items are provided. For example, a predetermined number of media content items that have the highest score(s) are provided (e.g., the top 10 highest scoring media content items are provided).

In some embodiments, providing the media content comprises determining a predefined number of media content items with the highest score(s) (as determined by the method described in FIGS. 7A-7B) and determining one or more media content items having a highest value for a particular objective (e.g., as determined by the method described in FIG. 6A-6B, or where the value for the particular objective is a preset value). For example, the electronic device identifies a respective objective and determines, for each media content item in the plurality of media content items, the score (e.g., value) for the respective objective (e.g., wherein the score for the respective objective is generated as described with reference to FIGS. 6A-6B). The one or more media content items are selected based on the score for the respective objective. In this way, providing the media content comprises selecting media content items based on the respective scores between the user and the media content items in the plurality of media content items and based on the respective score for a respective objective for one or more media content items.

In some embodiments, providing the media content comprises (734) determining an order of media content items to present to the user (e.g., automatically without receiving user input). In some embodiments, providing the media content comprises, within a playlist that includes a plurality of media content items, reordering the plurality of media content items such that the media content items with the highest score(s) are played first (e.g., the media content items are presented in order from highest scoring to lowest scoring). In some embodiments, the user does not select a next media content item to be played. For example, when the media content is provided during a radio session, the user does not select the next media content item to be played (e.g., streamed). In some embodiments, the media content is provided at the end of a playlist by automatically playing additional media content (e.g., that is not in the playlist) such that the user experience is not interrupted.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
at an electronic device associated with a media-providing service that includes one or more processors and memory storing one or more programs storing instructions executable by the electronic device:
for each respective media content item of a plurality of media content items:
receiving a representation of the media content item and a user;
generating a score for each objective in a hierarchy of objectives, comprising:
using the representation of the media content item and the user as inputs to a first machine learning algorithm, to generate a score for a first objective corresponding to a first level in the hierarchy of the objectives;
using an output of the first machine learning algorithm, distinct from the score for the first objective, as an input to a second machine learning algorithm to generate a score for a second objective corresponding to a second level in the hierarchy of objectives,
wherein the first machine learning algorithm and the second machine learning algorithm are trained using back-propagation from the second machine learning algorithm to the first machine learning algorithm;
generating a respective score between the user and the media content item using the score for the first objective and the score for the second objective;
selecting, automatically without user input, media content based on the respective scores between the user and the media content items in the plurality of media content items; and
streaming, using an application of the media-providing service, one or more of the selected media content to the user.

2. The method of claim 1, wherein the representation of the media content item comprises a vector describing the media content item.

3. The method of claim 1, wherein the representation of the user comprises a vector describing user features determined from a stored playback history of the user.

4. The method of claim 1, wherein the first level in the hierarchy of objectives includes a plurality of objectives, including the first objective and a third objective.

5. The method of claim 4, further comprising, generating a score for the third objective including using an output of a machine learning algorithm of the first objective.

6. The method of claim 1, wherein the first level in the hierarchy of objectives includes a plurality of objectives that comprise predicted objectives.

7. The method of claim 1, wherein the second level in the hierarchy of objectives includes one or more objectives that comprise satisfaction objectives.

8. The method of claim 1, wherein the first level in the hierarchy of objectives comprises a first predicted objective and the second level in the hierarchy of objectives comprises a second predicted objective, and the method further comprises:
using an output of the first machine learning algorithm, and an output of the second machine learning algorithm as inputs to a third machine learning algorithm to generate a score for a third objective corresponding to a third level in the hierarchy of objectives, wherein generating the respective score between the user and the media content item uses the score for the first objective, the score for the second objective and the score for the third objective.

9. The method of claim 8, further comprising, receiving a score for a fourth objective, wherein generating the respective score between the user and the media content item uses the score for the first objective, the score for the second objective and the score for the third objective.

10. The method of claim 1, wherein generating the respective score between the user and the media content item comprises computing an ordered weighted average using the score for the first objective and the score for the second objective.

11. The method of claim 1, further comprising, normalizing the representation of the media content item and the user, wherein the normalized representation is used to generate the score for each objective in the hierarchy of objectives.

12. An electronic device associated with a media-providing service, comprising:
one or more processors; and
memory storing one or more programs storing instructions executable by the one or more processors for:
for each respective media content item of a plurality of media content items:
receiving a representation of the media content item and a user;
generating a score for each objective in a hierarchy of objectives, comprising:
using the representation of the media content item and the user as inputs to a first machine learning algorithm, to generate a score for a first objective corresponding to a first level in the hierarchy of the objectives;
using an output of the first machine learning algorithm, distinct from the score for the first objective, as an input to a second machine learning algorithm to generate a score for a second objective corresponding to a second level in the hierarchy of objectives,
wherein the first machine learning algorithm and the second machine learning algorithm are trained using back-propagation from the second machine learning algorithm to the first machine learning algorithm;
generating a respective score between the user and the media content item using the score for the first objective and the score for the second objective;
selecting, automatically without user input, media content based on the respective scores between the user and the media content items in the plurality of media content items; and
streaming, using an application of the media-providing service, one or more of the selected media content to the user.

13. A non-transitory computer readable storage medium storing one or more programs configured for execution by one or more processors of a computer system associated with a media-providing service, the one or more programs comprising instructions for:
for each respective media content item of a plurality of media content items:
receiving a representation of the media content item and a user;

generating a score for each objective in a hierarchy of objectives, comprising:

using the representation of the media content item and the user as inputs to a first machine learning algorithm, to generate a score for a first objective corresponding to a first level in the hierarchy of the objectives;

using an output of the first machine learning algorithm, distinct from the score for the first objective, as an input to a second machine learning algorithm to generate a score for a second objective corresponding to a second level in the hierarchy of objectives, wherein the first machine learning algorithm and the second machine learning algorithm are trained using back-propagation from the second machine learning algorithm to the first machine learning algorithm;

generating a respective score between the user and the media content item using the score for the first objective and the score for the second objective;

selecting, automatically without user input, media content based on the respective scores between the user and the media content items in the plurality of media content items; and streaming, using an application of the media-providing service, one or more of the selected media content to the user.

14. The electronic device of claim 12, wherein the representation of the media content item comprises a vector describing the media content item.

15. The electronic device of claim 12, wherein the representation of the user comprises a vector describing user features determined from a stored playback history of the user.

16. The electronic device of claim 12, wherein the first level in the hierarchy of objectives includes a plurality of objectives, including the first objective and a third objective.

17. The electronic device of claim 16, wherein the one or more programs further store instructions for, generating a score for the third objective including using an output of a machine learning algorithm of the first objective.

18. The electronic device of claim 12, wherein the first level in the hierarchy of objectives includes a plurality of objectives that comprise predicted objectives.

19. The electronic device of claim 12, wherein the second level in the hierarchy of objectives includes one or more objectives that comprise satisfaction objectives.

20. The method of claim 1, wherein the hierarchy of objectives includes an engagement objective and a satisfaction objective.

* * * * *